No. 708,540. Patented Sept. 9, 1902.
N. F. FELTON.
ROUNDABOUT.
(Application filed Jan. 18, 1902.)
(No Model.)

Witnesses
Chas. K. Davies.
Esther E. Carrick.

Inventor
N. Frank Felton
by Fenelon B. Brock
Attorney

UNITED STATES PATENT OFFICE.

NORBORN FRANCIS FELTON, OF GRAND FORKS, NORTH DAKOTA.

ROUNDABOUT.

SPECIFICATION forming part of Letters Patent No. 708,540, dated September 9, 1902.

Application filed January 18, 1902. Serial No. 90,281. (No model.)

*To all whom it may concern:*

Be it known that I, NORBORN FRANCIS FELTON, of Grand Forks, county of Grand Forks, State of North Dakota, have invented certain new and useful Improvements in Roundabouts; and I do hereby declare the following is a full and clear description thereof.

My invention relates to games.

More particularly stated, the object of the improvement is to provide a roundabout for amusement purposes. This roundabout is adapted to carry one or more passengers along a circular path, preferably mounted upon the figure of some animal which has imparted to it a complex motion. For these purposes my invention consists in the following construction and combination of parts, the details of which will first be fully set forth and the features of novelty then pointed out and claimed.

Figure 1:
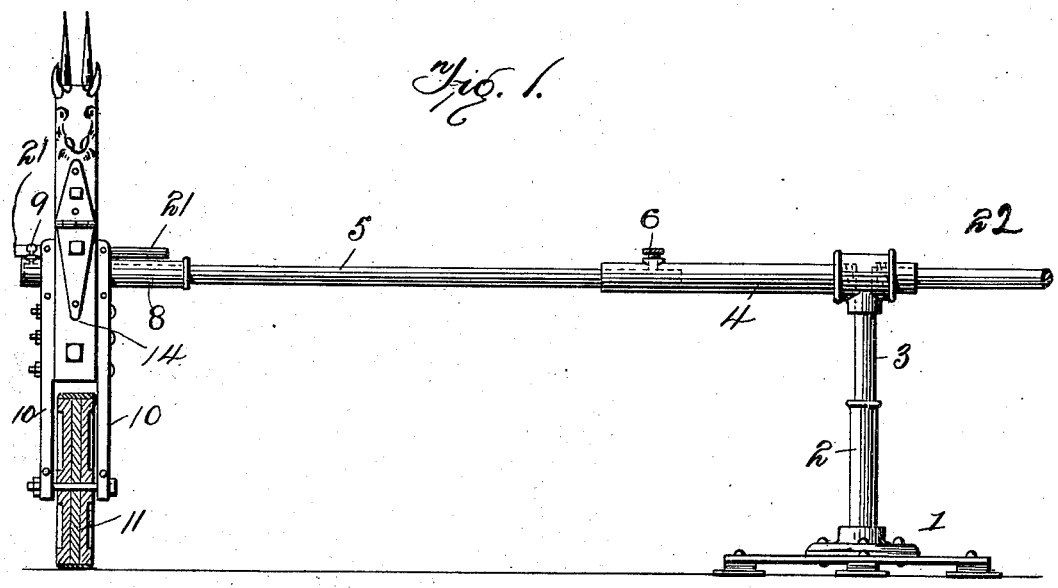
Figure 2:
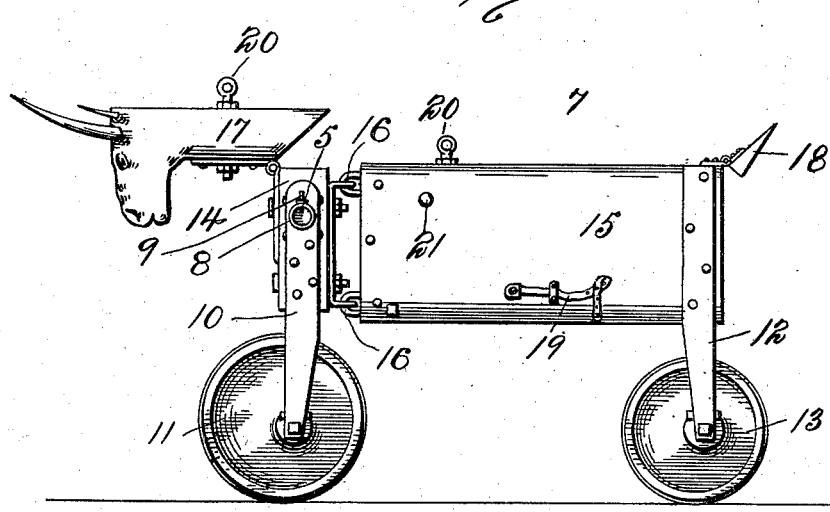

Figure 1 represents an elevation of a game device to which my improvements have been applied. Fig. 2 is a side elevation of an animal forming part of my invention.

In the drawings, 1 represents the base, adapted to be placed upon the floor and suitably secured thereto either by frictional contact or positive fastenings.

2 is an upright standard projecting from the base and rigidly secured thereto.

3 is a telescopic extension of the standard 2 and is adapted to rotate within the latter.

4 is a horizontal T extension of the vertically-rotatable part 3.

5 is a radial arm adapted to be inserted into the extension 4 and suitably locked thereto by a fastening, such as a pin 6.

7 represents an animal mounted upon the end of the radial arm 5, it being provided with a tubular socket 8, arranged at right angles thereto. This socket 8 is adapted to receive the radial arm 5, and means are provided for securing the rod in the socket, such as the set-screw 9. The animal is preferably a four-legged one. Its front and legs 10 are connected by a wheel 11 and its rear legs 12 by a wheel 13. This animal is constructed in two main parts, the fore portion 14 being hinged to the rear part 15 by a hinge arrangement, such as 16. The head and neck of the animal 17 are hinged to the fore part 14 and extend rearwardly over the hinge 16, forming the prolongation of the back and serving at the same time to cover the hinge. The hinge construction also facilitates transportation. The tail 18 is hinged to the rear portion 15, whereby the angle may be varied and transportation facilitated.

19 is a strap or straps on each side of the rear portion for the purpose of properly securing the rider. The head and neck are secured in operative upright position by fastenings, such as 20.

The wheels 11 and 13 are preferably of different diameters, and the axles of the wheels are set eccentric to the rims, whereby when the animal travels in a circular path an oscillatory undulated motion is also imparted to the animal of such an irregular character that the occupant cannot calculate in advance and thereby compensate for.

Upon the opposite side of the standard 2 from the animal is an arm 22, projecting in an opposite direction, by means of which the device is rotated, preferably by hand-power.

21 represents extensions or handles for the rider.

It will be noted in the revolution of the device that the fore part of the animal 14 preserves the same relation to the radial bar throughout the movements of the device, being rigid therewith, and that the rear portion 15 by means of the hinges 16 trails the front portion.

It will be understood that the invention may be adapted to be revolved by a motor as well as by hand-power. More than one animal may be mounted upon two or more radial rods if it should be desired. In this particular instance the animal is shown in the form of a conventional goat. It is proposed to cover the framework of the goat with a goat-skin or other appropriate covering. My roundabout has been successfully used in a number of instances for amusement purposes by secret societies, where the traditional sport of "riding the goat" has been literally carried out. It will be understood, however, that any other animal or animals or figured representation may be substituted without departing from my invention.

What I claim as new, and desire to secure by Letters Patent, is—

1. The combination of a revoluble standard, a radial arm carried thereby, a wheeled forward figure portion rigidly secured to the radial arm, a wheeled rear figure portion hinged to the forward figure portion and trailing circumferentially around the standard.

2. In a roundabout, the combination of a revoluble standard, a radial arm, a hinged two-part figure carried by the arm one section of which is rigidly connected with the radial arm and eccentric wheels mounted upon both parts of the figure.

3. In a roundabout, the combination of a revoluble standard, a radial arm carried thereby, a two-part hinged figure mounted thereon, one section of which is rigidly connected with the radial arm, and eccentrically-mounted wheels upon the figure, the wheel upon one part being of a different diameter from that of the other figure.

4. In a roundabout, the combination of a revoluble standard, a radial arm carried thereby, a two-part hinged wheeled figure mounted thereon one section of which is rigidly connected with the radial arm and a head hinged to the fore part of the figure.

5. The combination of a revoluble standard, a radial arm carried thereby, a two-part figure, a supporting-wheel carried by each part, a hinge between said parts, and a rigid connection between the forward section and the radial arm, whereby the forward section traverses and constitutes a guide for the after-trailing section.

In testimony whereof I have affixed my signature in the presence of two witnesses.

NORBORN FRANCIS FELTON.

Witnesses:
B. S. SWENGEL,
F. W. WILDER.